(12) United States Patent
Chen

(10) Patent No.: US 6,595,447 B2
(45) Date of Patent: Jul. 22, 2003

(54) PEPPER GRINDER

(76) Inventor: Wen-shou Chen, No. 18, Alley 28, Lane 103, Yen Cheng Rd., Tainan (TW)

( * ) Notice: Subject to any disclaimer, the term of this patent is extended or adjusted under 35 U.S.C. 154(b) by 20 days.

(21) Appl. No.: 09/957,244

(22) Filed: Sep. 21, 2001

(65) Prior Publication Data
US 2002/0038832 A1 Apr. 4, 2002

(30) Foreign Application Priority Data
Sep. 30, 2000 (TW) ........................................ 89217015 U

(51) Int. Cl.$^7$ ................................................. A47J 42/34
(52) U.S. Cl. ..................................................... 241/169
(58) Field of Search ................................ 241/168, 169, 241/169.1

(56) References Cited

U.S. PATENT DOCUMENTS 2,679,360 A * 5/1954 Arni
2,698,719 A * 1/1955 Heard
4,697,749 A * 10/1987 Holcomb et al. ........... 241/169

* cited by examiner

Primary Examiner—Mark Rosenbaum
(74) Attorney, Agent, or Firm—Rosenberg, Klein & Lee

(57) ABSTRACT

A pepper grinder is composed of an accommodation holder engaged to a grinding holder to define an accommodation chamber containing a grinding rod constantly pushing upward and provided with a spring, a grinding chute being provided at the grinding holder in relation to the lower end of the grinding rod; pepper grains being ground between the grinding rod and the grinding chute into powders or finer grains; multiples of grinding tooth protruding from the outer surface at the lower end of the grinding rod with guiding slots interconnected to one other provided on the peripheral of each grinding tooth with at least one recess disposed inward at the lower end of the grinding rod to further facilitate discharge of those pepper powders or finer grains.

3 Claims, 6 Drawing Sheets

PEPPER GRINDER

BACKGROUND OF THE INVENTION (a) Field of the Invention

The present invention relates to a pepper grinder, and more particularly to one that provided with multiple grinding teeth protruding from the lower end of a grinding rod and multiple guide slots which are cross interconnected to one another are provided in recess on the peripheral of each grinding tooth.

(b) Description of the Prior Art

Pepper, as seasoning is a must to fine food. Usually, raw pepper is ground into powder or fine grains for use.

As illustrated in FIGS. 1 and 2, for a partially perspective view and sectional view of a grinder 1 of the prior art, which includes an accommodation holder 10 of the upper part and a grinding holder 14 of the lower part screwed to each other, and a grinding rod 11 inserted through the accommodation holder 10 and allowing longitudinal displacement, the lower end 12 of the grinding rod 11 being relatively penetrating through a grinding hole 15 provided in the center of the grinding holder 14 while the outer surface of the lower end 12 of the grinding rod 11 being provided multiples of grinding rings 13 for the lower end 12 of the grinding rod 11 and its corresponding grinding hole 15 to grind pepper grains into finer grains or power when the grinding rod 11 is pressed.

However, the grinder 1 of the prior art is found with the following defects:

1. As the grinding by the grinder 1 of the prior art is achieved by those grinding rings 13 provided at the lower end 12 of the grinder 11 and the grinding hole 15 of the grinding holder 14 to grind pepper into powders or fine gains, the grinding area formed as the lower end 12 contacts the grinding hole 15 is only limited to a significantly smaller area at the top of those grinding rings 13, preventing effective grinding results.
2. Pepper grains after the grinding easily get stuck between the grinding hole 15 and the lower end 12 of the grinding rod 11 due to the poor grinding results by the smaller grinding area provided by the grinder 1 of the prior art, making it difficult to press the grinding rod 11.

SUMMARY OF THE INVENTION

The primary purpose of the present invention is to provide a pepper grinder. To achieve the purpose, a grinding holder having a charge chute tapering downward to deposit pepper grains, a vertical grinding chute abutted to where below the charge chute and a discharge chute for the ground pepper grains to pass through, a hollow accommodation holder connected to where above the grinder grinding holder for both to define a containing chamber to accommodate pepper grains; and a grinding rod provided with a spring and inserted through the containing chamber to execute longitudinal movement, having its upper end deflecting upward and exposing out of the containing chamber and its lower end disposed in the grinding chute of the grinding holder, and multiples of grinding tooth abutted to one another protruding from the outer surface of the lower part of the grinding rod with each grinding tooth provided on its peripheral a guide slot; and the pepper grains being ground by friction between those grinding teeth and the grinding chute into finer grains. Accordingly the present invention improves the grinding efficiency by increasing the grinding contact area.

The secondary purpose of the present invention is to provide a pepper grinder having its top edge of the grinding chute being located at where above the bottom edge of the charge chute to create an acute angle for facilitating to discharge the ground pepper grains.

DETAILED DESCRIPTION OF THE PREFERRED EMBODIMENTS

Figure 1:
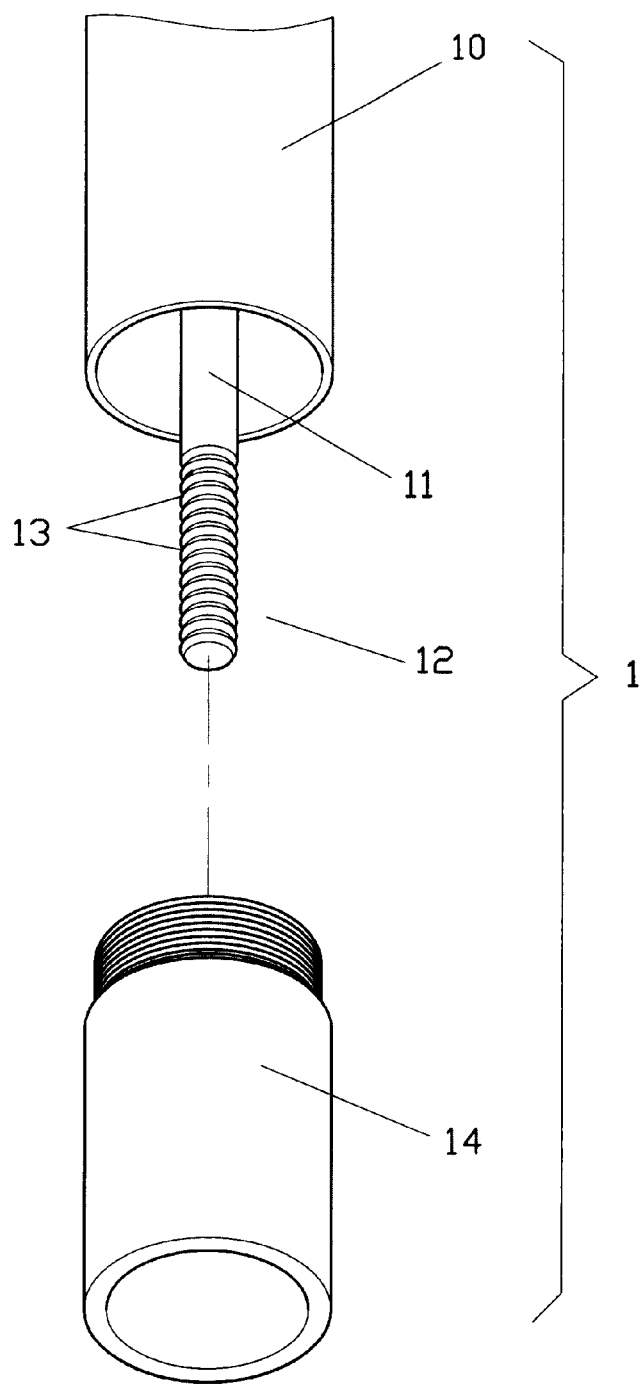
FIG. 1 is a perspective view showing a grinding rod of a grinder of the prior art.
Figure 2:
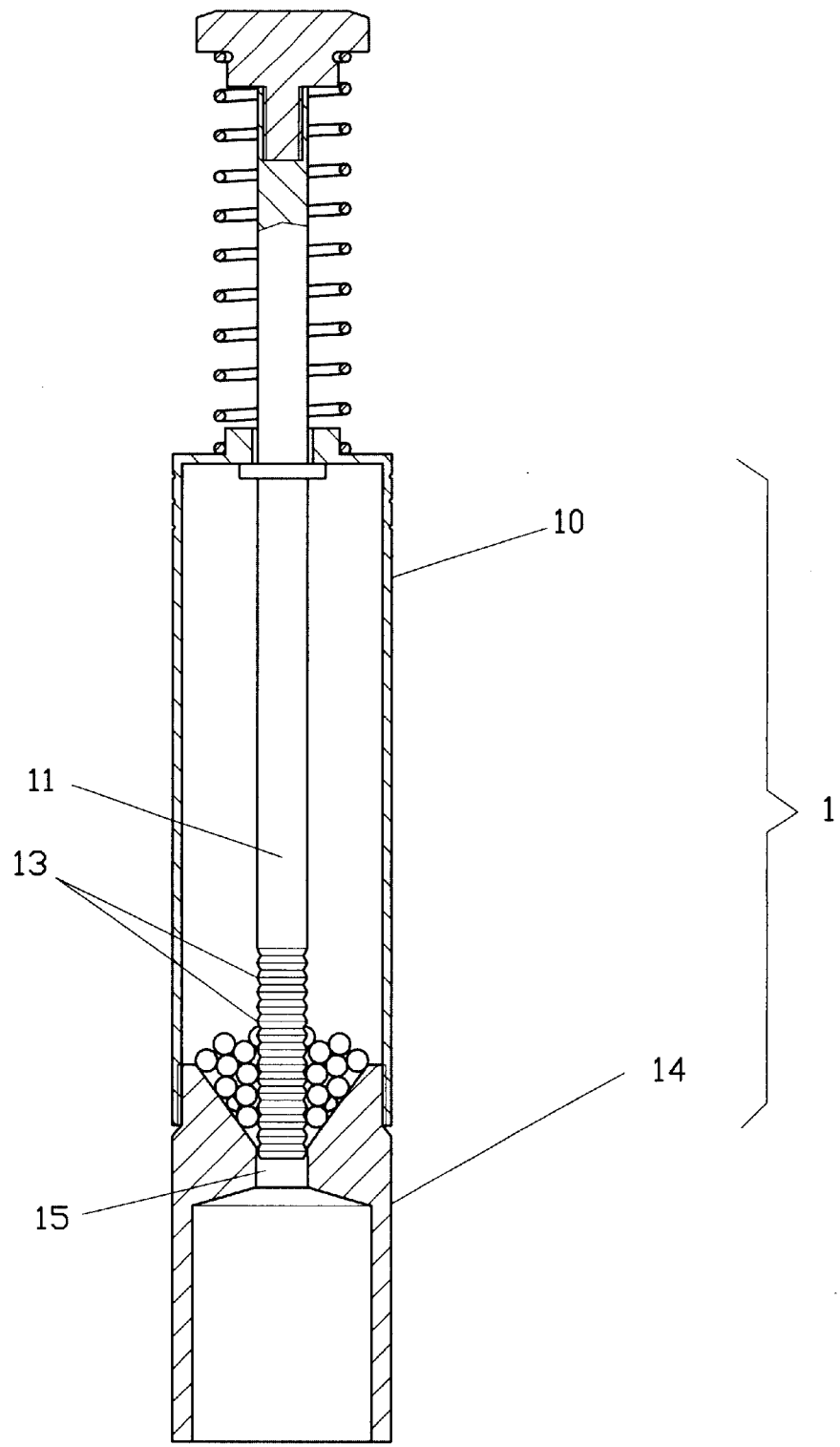
FIG. 2 is a sectional view of the grinder of the prior art.
Figure 3:
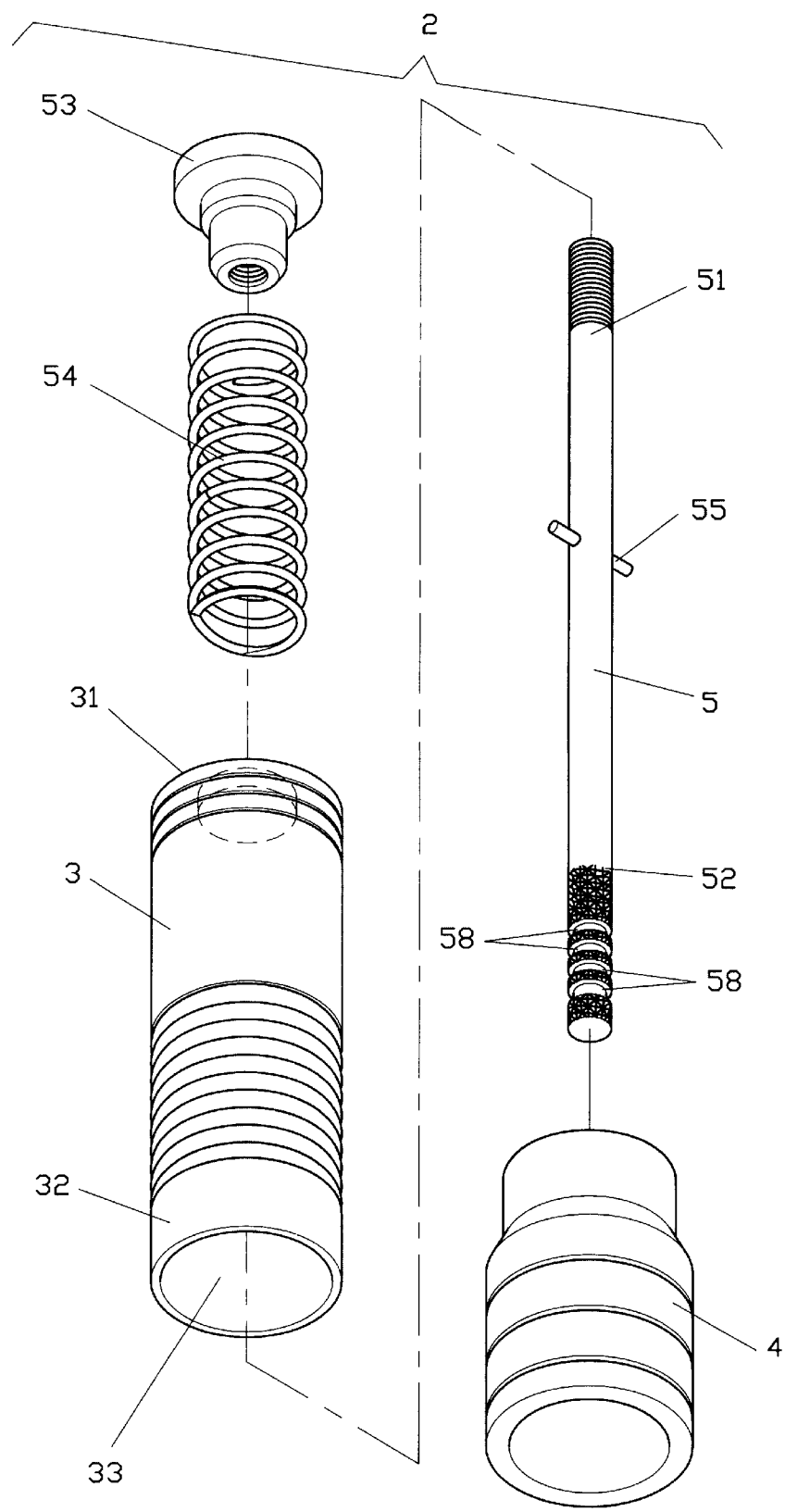
FIG. 3 is a perspective view of a preferred embodiment of the present invention.
Figure 4:
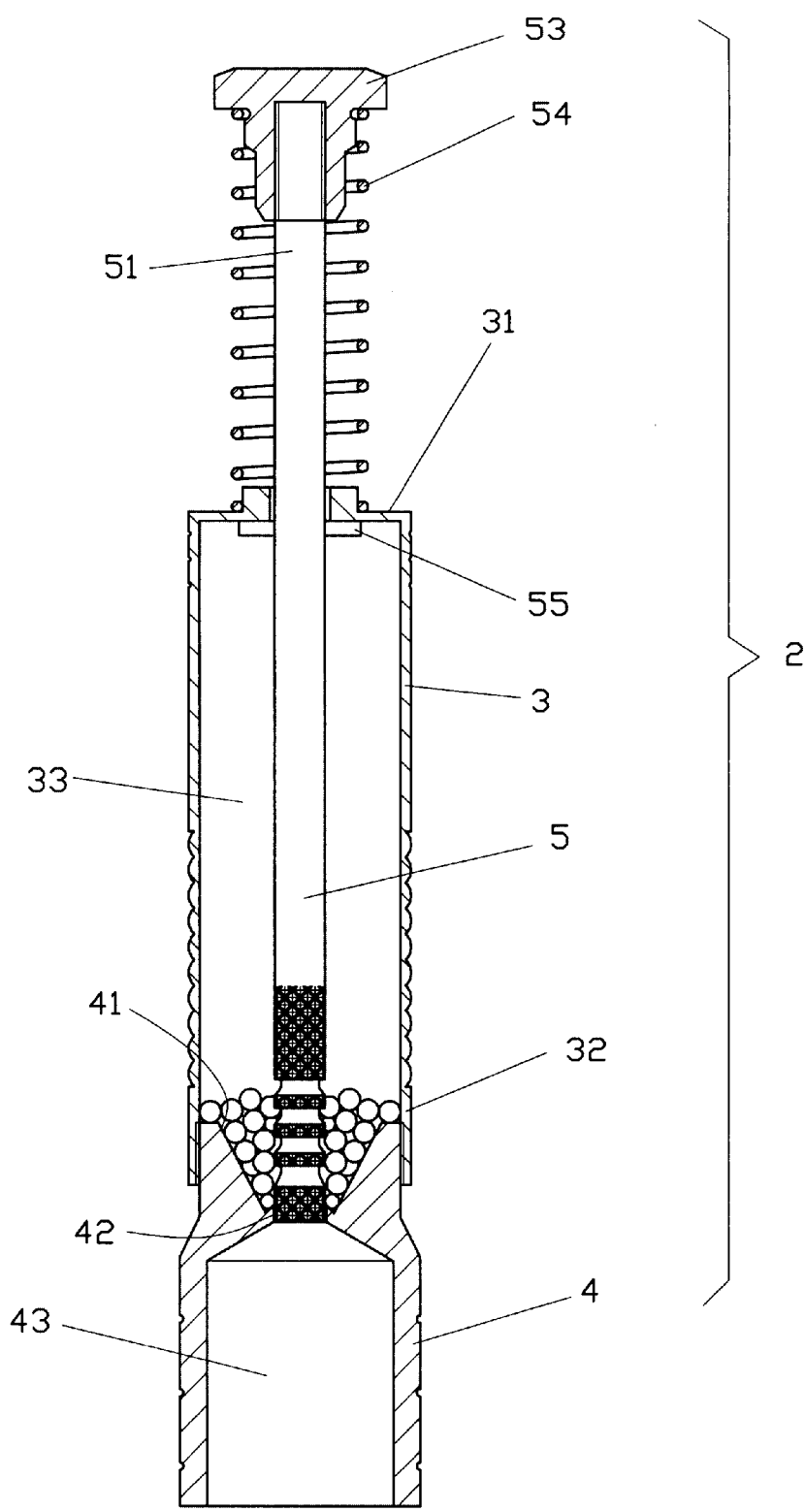
FIG. 4 is a sectional view of the preferred embodiment of the present invention.

As illustrated in FIGS. 3 and 4, a pepper grinder 2 of a preferred embodiment of the present invention to grind pepper grains is composed of an accommodation holder 3, a grinding holder 4 and a grinding rod 5 provided with a spring.

Figure 5:
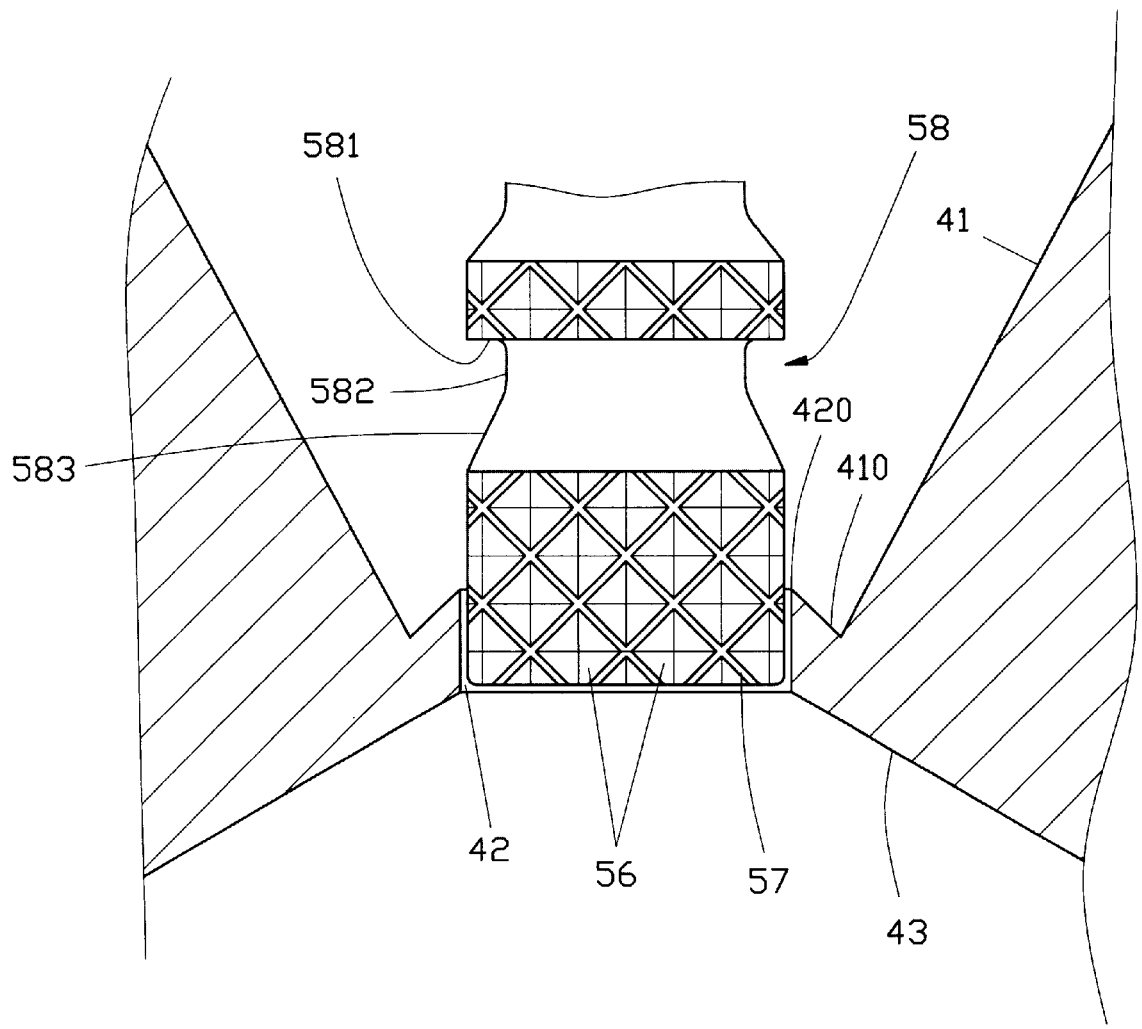
FIG. 5 is an enlarged view of the multiples of grinding tooth and a grinding chute of the preferred embodiment of the present invention.

As illustrated in FIGS. 4 and 5, the grinding holder 4 contains a charge chute 41 tapering downward, a vertical grinding chute 42 abutted to where below the charge chute 41 and a discharge chute 43 abutted to where below the grinding chute 42. The charge chute 41 is used to deposit pepper grains and to smoothly guide them downward while the discharge chute 43 is provided for the ground pepper powders and finer grains to pass through. Referring to FIG. 5, a top edge 420 of the grinding chute 42 is located at where above the bottom edge 410 of the charge chute 41 to create an acute angle with the top edge 420 of the grinding chute 42.

Now referring to FIGS. 3 and 4, the accommodation holder 3 relates to a hollow tube connected by threads to the upper part of the grinding holder 4. The accommodation holder 3 has a closed upper end 31 and an open lower end 32 defining together with the grinding holder 4, an accommodation chamber 33 to receive the pepper grains.

Adapted with a spring, the grinding rod 5 is inserted through the accommodation chamber 33. The grinding rod 5 has its upper end 51 protruding into the close end 31 of the accommodation holder 3 and its lower end 52 disposed inside the grinding chute 42 of the grinding holder 4. A press member 53 is screwed to the upper end 51 of the grinding rod 5. A spring 54 is provided between the press member 53 and the close end 31 of the accommodation holder 3 so that both ends of the spring 54 respectively holding against the press member 53 and the close end 31. The grinding rod 5 is constantly deflected upward by spring from the spring 54. A limit lever 55 is laterally provided on the grinding rod 5 to restrict the height of the grinding rod 5 being pushed above. Referring to FIG. 5, multiples of grinding tooth 56 abutted to one another protrude from the outer surface of the lower end 52 of the grinding rod 5 with each grinding tooth 56 indicating a quadrilateral conic shape. The multiples of grinding tooth 56 are provided with multiple guiding slot 57 being arranged in alternatively cross pattern in radial and inwardly along the peripheral of each tooth 56. Four recesses 58 are provided at a given spacing at the lower part 52 of the grinding rod 5 with each of the recesses 58 provided a transversal retaining surface 581, a vertical surface 582 abutted to the terminal of the retaining surface 581 and an inclined guide surface 583 leaning outward and downward being connected to the terminal of the vertical surface 582. The limit lever 55 may be alternatively provided in a form of a ring (not illustrated) laterally protruding from the grinding rod 5 to achieve the same purpose.

Figure 6:
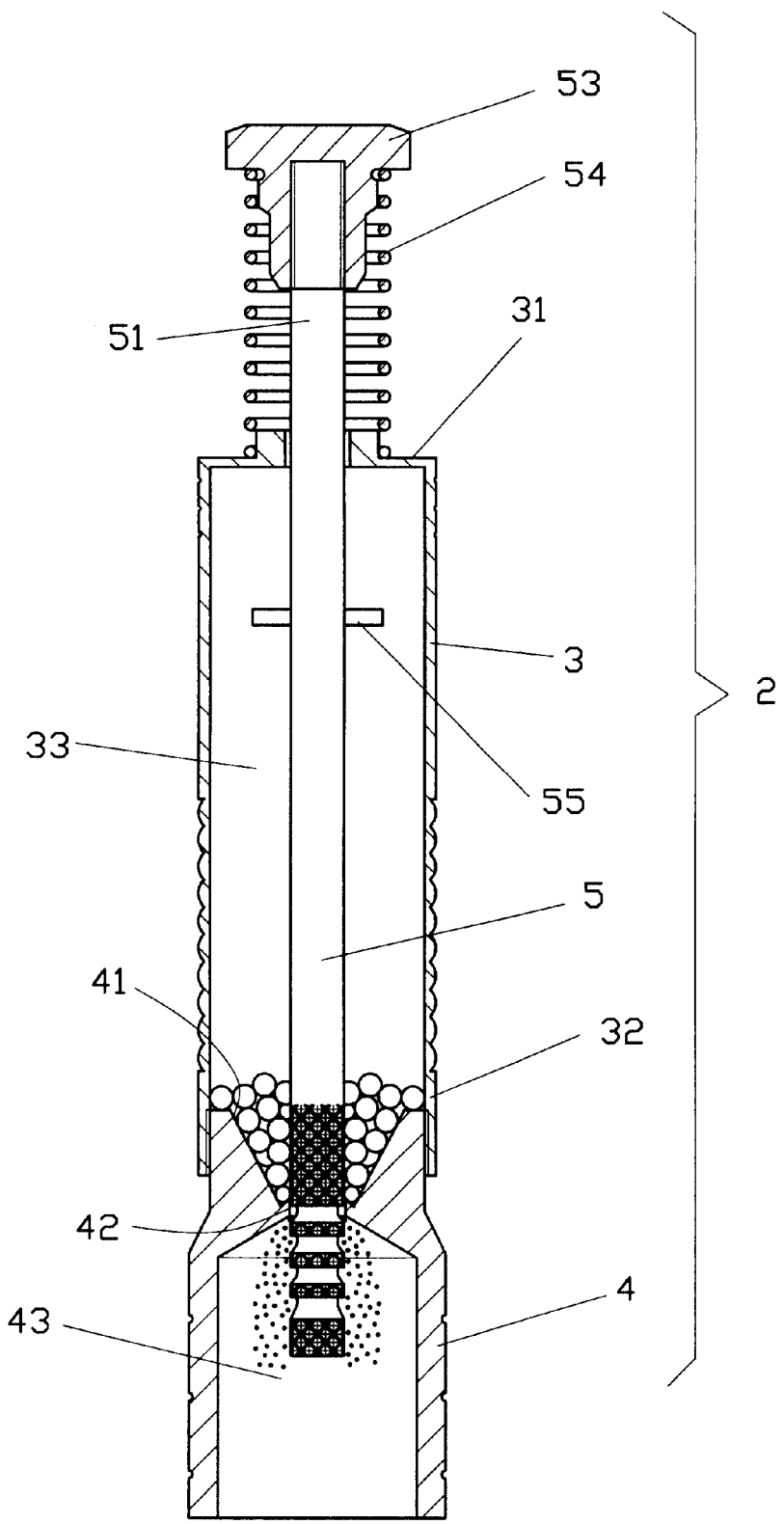
FIG. 6 is a view showing the grinding executed by the preferred embodiment of the present invention.

Upon assembling as illustrated in FIGS. 5 and 6, pepper grains are put into the accommodation chamber 33 of the accommodation holder 3. The grinding holder 4 is engaged to the open end 32 of the accommodation holder 3 for the pepper grains to accumulate toward the grinding chute 42 along the charge chute 41. By repeatedly pressing the press member 53 for the grinding rod 5 to execute longitudinal deflection, the retaining surface 581 of the recess 58 squeezes and pushes down pepper grains. Pepper grains are cut into smaller grains by the top edge 420 of the grinding chute 42 before being further ground by those grinding teeth 56 in the grinding chute 42 into powders or even finer grains and delivered by the discharge chute 43.

As disclosed above, the present invention provides the following advantages:

1. Efficiently improved grinding result. Those grinding teeth 56 are distributed all over the lower end 52 of the grinding rod 5 with each related to a quadrilateral conic, i.e. four grinding surfaces to significantly increase the grinding area larger than that of the grinder 1 of the prior art disclosed above.
2. Reliable grinding. Pepper powders or finer grains accumulate and are squeezed to move upward along those guide slot 57 between the grinding teeth 56 and into the recesses 58 for being temporarily deposited therein and descend by central gravity until said recesses 58 protrude out of said grinding chute 42. In this way, pepper powders or finer grains are prevented from being stuck between the lower end 52 of the grinding rod 5 and the grinding chute 42 in the course of grinding.
3. Whereas the recess 58 provided to the grinding rod 5 pushes down and squeezes pepper grains with its retaining surface 581, pepper grains are ground into smaller grains when passing through the top edge 420 of the grinding chute 42 for further grinding to achieve even better grinding results.

The present invention is also applicable to grind coffee beans, or peanuts into powders.

The pepper grinder disclosed above is only a preferred embodiment of the present invention and in no way it restricts the scope of the patent to be claimed for the present invention. Therefore, any variation of equivalent effect by operation of the specification and claimed made for the present invention shall fall within the scope of the claims made for the present invention.

I claim:

1. A pepper grinder to grind pepper grains comprising:

a grinding holder defining a charge chute and a discharge chute disposed in open communication through a vertical grinding chute disposed therebetween, the charge chute tapering downward for guiding pepper grains deposited therein, the vertical grinding chute extending upward from a bottom portion of the charge chute at an acute angle relative thereto; the discharge chute being disposed below the grinding chute for the ground pepper grains to pass through;

a hollow accommodation holder connected to the grinding holder to define together with the grinding holder an accommodation chamber for holding pepper grains; and a grinding rod coupled to the accommodation holder, the grinding rod being provided with a spring biased upper end protruding out of the accommodation holder, and a lower end extending into the grinding chute of the grinding holder, an outer surface of the lower end having formed to protrude therefrom a plurality of grinding teeth separated by a plurality of guide slots, the lower end being formed with at least one inwardly directed recess for guiding the pepper grains being squeezed and ground between the grinding teeth and the grinding chute responsive to longitudinal actuation of the grinding rod.

2. The pepper grinder as claimed in claim 1, wherein each of said grinding teeth is formed with a quadrilateral conic shape.

3. The pepper grinder as claimed in claim 1, wherein each recess is provided with a transversal retaining surface, a vertical surface extending from the retaining surface, and a guiding surface connected to the vertical surface to incline outward and downward therefrom.

* * * * *